(12) United States Patent
Chou et al.

(10) Patent No.: US 11,221,547 B2
(45) Date of Patent: Jan. 11, 2022

(54) PROJECTOR

(71) Applicants: BenQ Intelligent Technology (Shanghai) Co., Ltd, Shanghai (CN); BENQ CORPORATION, Taipei (TW)

(72) Inventors: Tung-Chia Chou, New Taipei (TW); Chin-Fu Chiang, New Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 17/070,866

(22) Filed: Oct. 14, 2020

(65) Prior Publication Data

US 2021/0132478 A1 May 6, 2021

(30) Foreign Application Priority Data

Oct. 30, 2019 (CN) .......................... 201911047240.6

(51) Int. Cl.
*G03B 21/14* (2006.01)
*H04N 9/31* (2006.01)
*G03B 21/26* (2006.01)

(52) U.S. Cl.
CPC .......... *G03B 21/142* (2013.01); *G03B 21/26* (2013.01); *H04N 9/3194* (2013.01)

(58) Field of Classification Search
CPC .............. G03B 21/00; G03B 21/14142; G03B 21/147; G03B 21/26; G03B 21/005; G03B 21/006; G03B 21/007; H04N 9/31; H04N 9/3194; H04N 9/3185

USPC ......................................................... 353/122
See application file for complete search history.

(56) References Cited

U.S. PATENT DOCUMENTS

| | | | | |
|---|---|---|---|---|
| 7,623,135 B1 * | 11/2009 | Diamond | ............. | H04N 9/3185 345/582 |
| 2017/0180714 A1 * | 6/2017 | Helt | ...................... | H04N 13/363 |
| 2021/0274137 A1 * | 9/2021 | Goto | .................... | H04N 9/3152 |

FOREIGN PATENT DOCUMENTS

| | | |
|---|---|---|
| CN | 110161793 A | 8/2019 |
| CN | 110389494 A | 10/2019 |
| JP | H11327042 A | 11/1999 |

OTHER PUBLICATIONS

Office action of counterpart application by SIPO dated Jan. 26, 2021.

\* cited by examiner

*Primary Examiner* — William C. Dowling

(57) ABSTRACT

A projector including an optical machine, a lens and a casing is provided. The optical machine is configured to form an optical image. The lens is located on a projection path of the optical machine so that the optical image is projected on the lens. The casing is configured to receive the optical machine and the lens. The casing is provided with a positioning mark, which is aligned with an imaging center of the optical image in a vertical direction and configured to align the imaging center of the optical image with a center of a projection screen.

20 Claims, 6 Drawing Sheets

PROJECTOR

This application claims the benefit of People's Republic of China application Serial No. 201911047240.6, filed Oct. 30, 2019, the subject matter of which is incorporated herein by reference.

BACKGROUND OF THE INVENTION

Field of the Invention

The invention relates in general to a projector, and more particularly to a projector with positioning function.

Description of the Related Art

During the installation of a projector, if the installation personnel cannot obtain the center of the lens cannot be obtained, they will not be able to align the center of the lens with the center of the projection screen. If the center of the lens cannot be aligned with the center of the projection screen, the imaging quality will be affected. Particularly, the ultrashort focus reflective lens is embedded in the casing of the projector, making it difficult for the installation personnel to determine the center position of the lens.

On the other hand, if the projector is not correctly installed, normally the problem of incorrect installation is fixed through lens shift and keystone correction. However, the lens shift function, which increases the overall cost, normally is available only on high-end projectors. Besides, keystone correction generates a jagged screen and affects the imaging quality.

SUMMARY OF THE INVENTION

The invention is directed to a projector having a positioning function providing installation convenience to the user.

According to one embodiment of the present invention, a projector including an optical machine, a lens and a casing is provided. The optical machine is configured to form an optical image. The lens is located on a projection path of the optical machine so that the optical image is projected on the lens. The casing is configured to receive the optical machine and the lens. The casing is provided with a positioning mark, which is aligned with an imaging center of the optical image in the vertical direction and configured to align the imaging center of the optical image with a center of a projection screen.

According to another embodiment of the present invention, a projector including an optical machine, a lens, a laser emitter, and a casing is provided. The optical machine is configured to form an optical image. The lens is located on a projection path of the optical machine to project the optical image on the lens. The laser emitter is configured to form a laser mark on a projection screen. The casing is configured to receive the optical machine and the lens, wherein the laser mark is aligned with an imaging center of the optical image in the vertical direction.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms, such as above, under, left, right, front, or back, are used in the following embodiments to indicate the directions of the accompanying drawings, not for limiting the present invention.

According to an embodiment of the present invention, a projector with a positioning mark is provided, wherein the positioning mark is configured to align the imaging center of the optical image with the center of a projection screen.

Figure 1:
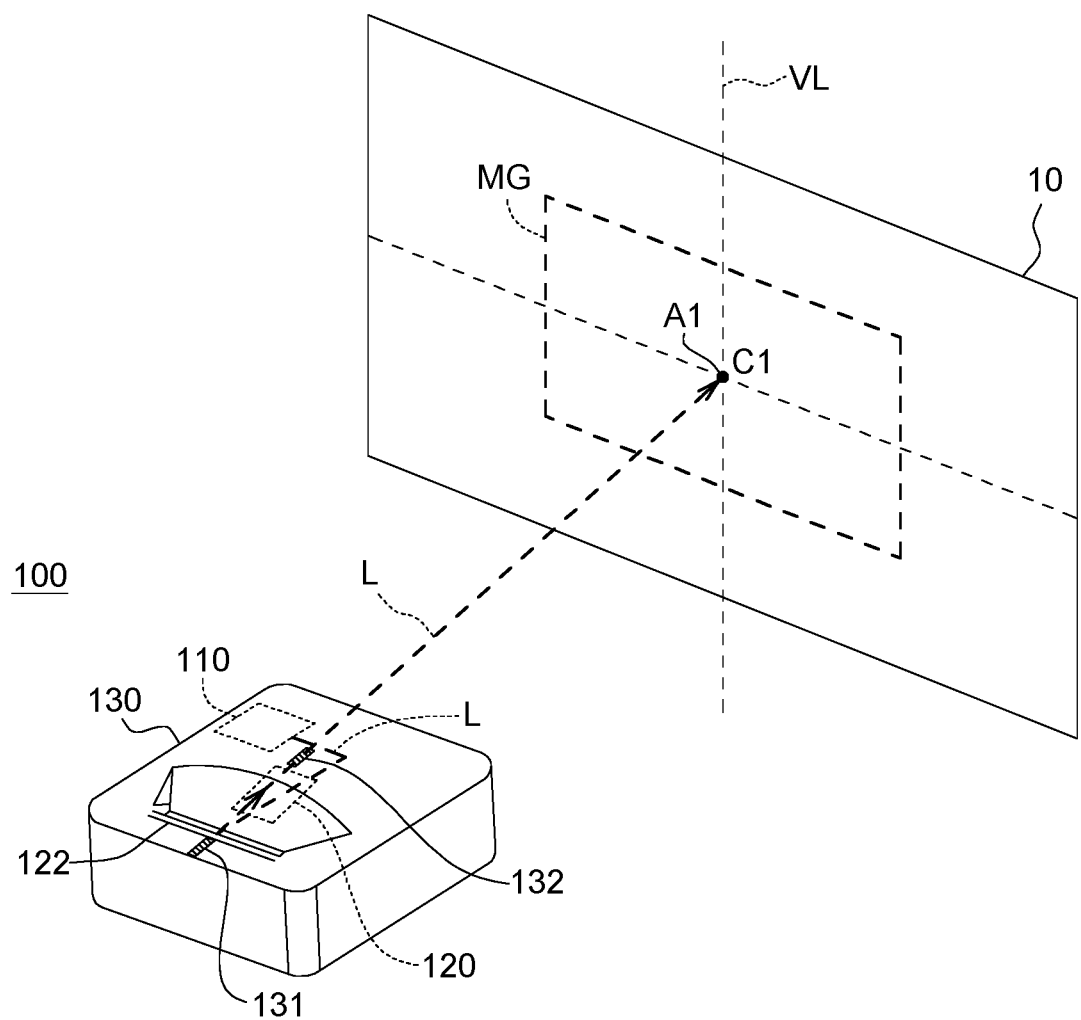
FIG. 1 is a schematic diagram of a projector according to an embodiment of the present invention.
Figure 2:
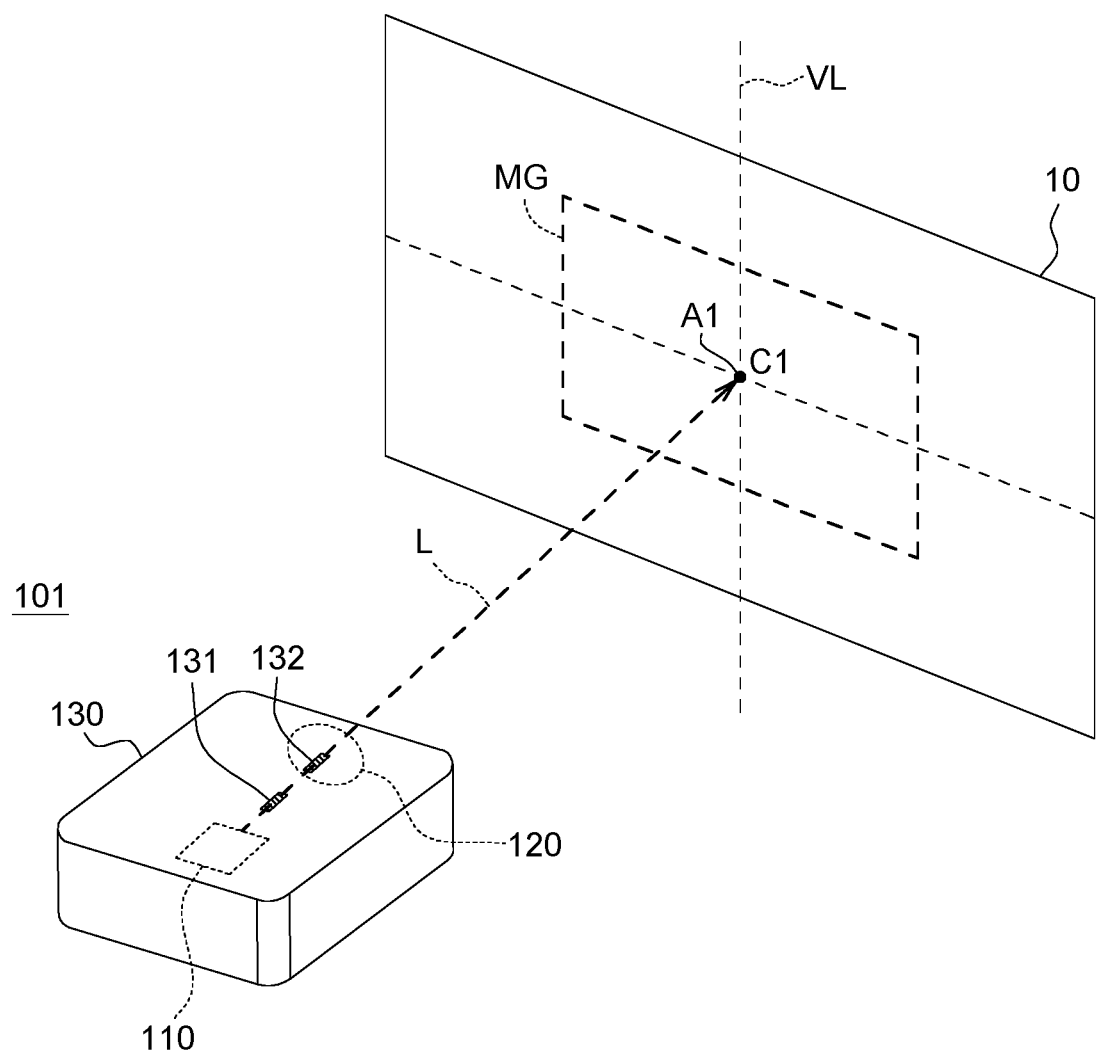
FIG. 2 is a schematic diagram of a projector according to another embodiment of the present invention.

Referring to FIG. 1 and FIG. 2, schematic diagrams of projectors 100 and 101 according to two embodiments of the present invention are respectively shown. The projectors 100 and 101 both include an optical machine 110, a lens 120 and a casing 130. The projectors 100 and 101 are different from each other in that the projector 100 of FIG. 1 includes a reflector 122 disposed on the casing 130 and configured to reflect the optical image MG to realize ultrashort throw ratio, but the projector 101 of FIG. 2 does not have the reflector 122 and directly projects the optical image MG through the lens 120 (that is, the projection lens).

The optical machine 110 is configured to form an optical image MG. The optical machine 110 has at least a light source. The output light of the light source can be a white light or an RGB light. The output light can be split or combined by an optical element, such as color wheel, beam splitter, or light combination prism, to form an optical image MG. The optical image MG is focused by the lens 120 and then is projected to the reflector 122 (as indicated in FIG. 1); or, the optical image MG is focused by the lens 120 and then is directly outputted (as indicated in FIG. 2) and projected on the projection screen 10. The optical machine 110, for example, can be a digital light processor (DLP) or a 3-chip liquid crystal display (3LCD) module.

Figure 3:
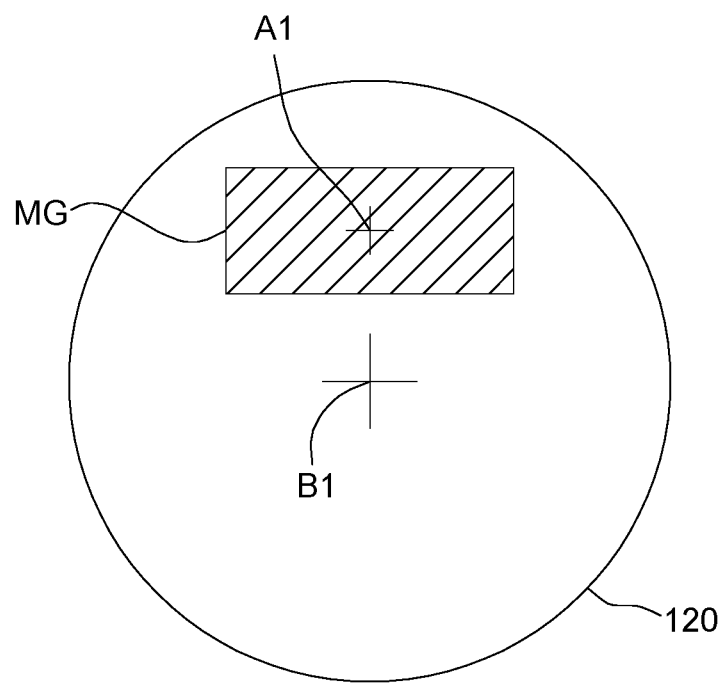
FIG. 3 is a schematic diagram of the imaging center of an optical image and the center of a lens according to an embodiment of the present invention.

The lens 120 is located on a projection path L of the optical machine 110, so that the optical image MG can be projected on the lens 120. Besides, the casing 130 is configured to receive the optical machine 110 and the lens 120 to avoid the interference of external stray light. Generally speaking, the lens 120 has an optical axis aligned with the center B1 of the lens 120, and the optical image MG can be projected on the lens 120 along the optical axis or off the axial direction of the optical axis to form a squared imaging area. Referring to FIG. 3, a schematic diagram of the imaging center A1 of the optical image MG and the center B1 of the lens 120 according to an embodiment of the present invention is shown. The optical image MG has an imaging center A1 whose position is relevant with the optical path design of the projectors 100 and 101. After the imaging center A1 is adjusted by the factory personnel before the projector 100 leaves the factory, the imaging center A1 is deviated from of the center B1 of the lens 120. That is, the imaging center A1 of the optical image MG is not in the center B1 of the lens 120, and the imaging center A1 of the optical image MG cannot be obtained according to the center B1 of the lens 120 only. Particularly, since the lens 120 of reflective type projector 100 in FIG. 1 is embedded in the casing 130, the installation personnel will find it difficult to determine the position of the center B1 of the lens 120.

In the present embodiment, for an ordinary user to quickly obtain the imaging center A1 of the optical image MG, the casing 130 is provided with at least one positioning mark 131 and/or 132. By viewing the at least one positioning mark 131 and/or 132, the user can immediately obtain the imaging center A1 of the optical image MG. The positioning marks 131 and 132 include at least one alignment line (such as two aligned lines), at least one alignment point (such as two aligned points), or a combination of the at least one alignment line and the at least one alignment point.

Refer to FIG. 1 and FIG. 2. The quantity of at least one positioning mark 131 and/or 132 can be one or two. For example, the positioning marks 131 and 132 are two alignment lines respectively provided at the front and the rear of the top surface of the casing 130. The positioning marks 131 and 132 can be marked by the factory personnel when the projectors 100 and 101 leave factory or can be integrally formed on the casing 130, and different projector models have different positions for the positioning marks 131 and 132, such that the user can easily recognize the position of the center A1 of the optical image MG on the projectors 100 and 101 of different models.

Figure 4A:
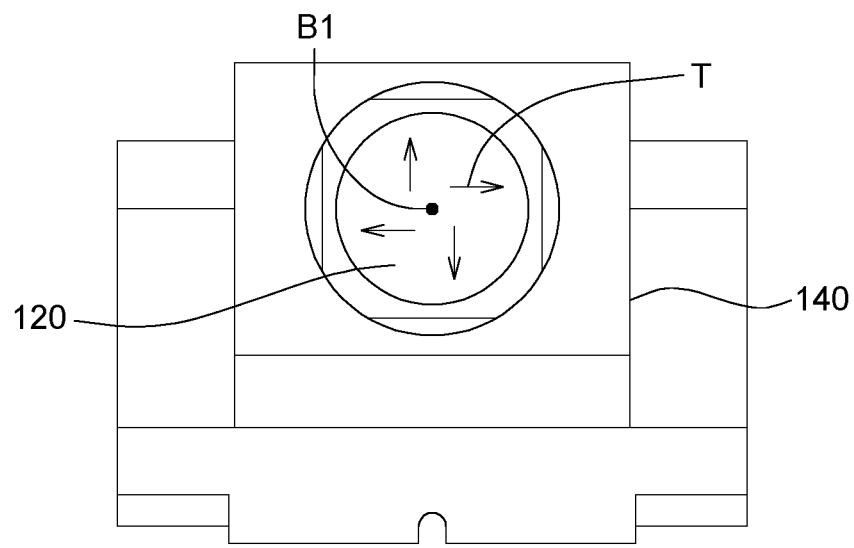
FIG. 4A and FIG. 4B respectively are a front view and a side view of a lens adjusting mechanism according to an embodiment of the present invention.
Figure 4B:
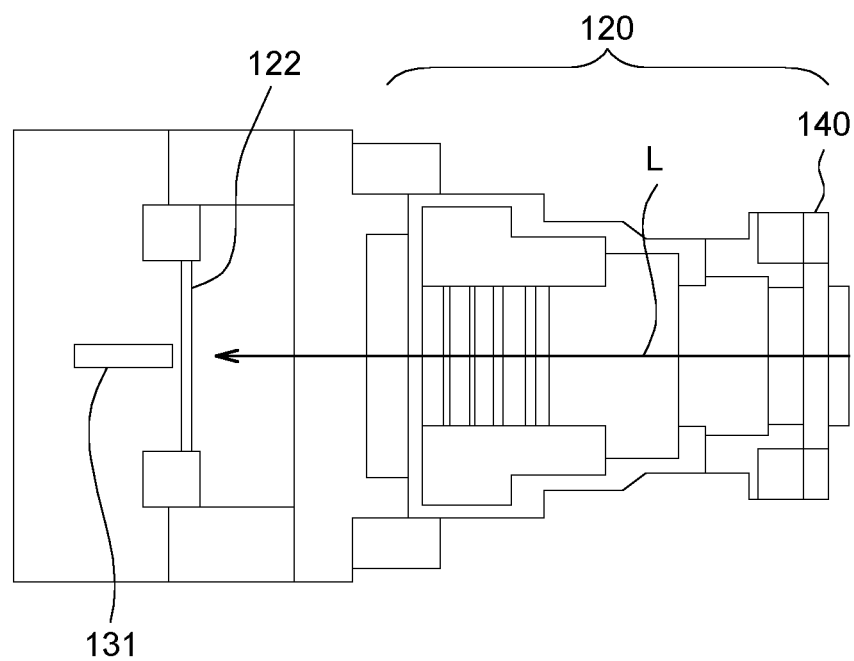

Referring to FIG. 4A and FIG. 4B, a front view and a side view of a lens adjusting mechanism 140 according to an embodiment of the present invention are respectively shown. The lens 120 is formed of a set of optical lenses. When an optical image MG is outputted from the optical machine 110, the lens 120 enlarges the projection of the optical image MG on the projection screen 10. Moreover, the lens adjusting mechanism 140 has a lens positioning frame and an adjusting member (not illustrated) respectively configured to fix the lens 120 and adjust the position of the center B1 of the lens 120 to shift the position of the center B1 of the lens 120 to a predetermined position.

For example, during the factory setting of the projectors 100 and 101, when the center B1 of the lens 120 is biased, the lens 120 can be shifted to correct the position of the center B1 of the lens 120, and the position of the imaging center A1 of the optical image MG can be marked by the at least one positioning mark 131 and/or 132 for the user's reference. Before leaving the factory, the projectors 100 and 101 need to pass the lens shift test in which the projectors 100 and 101 are adjusted upward, downward, leftward, or rightward according to the arrow direction T. Since the imaging center A1 of the optical image MG is not necessarily located at the center of the lens 120, the positioning marks 131 and/or 132 on the casing 130 are crucial to the installation personnel.

In FIGS. 1 and 2, the positioning marks 131 and 132 are aligned with an imaging center A1 of the optical image MG in the vertical direction. Since the imaging center A1 of the optical image MG is unknown when the projector leaves the factory, the user can obtain the imaging center A1 of the optical image MG from at least one positioning mark 131 and/or 132. Then, the center C1 or the vertical center line VL of a projection screen 10 can be aligned through the assistance of the at least two positioning marks 131 and 132, such that the imaging center A1 of the optical image MG can be aligned with the center C1 of the projection screen 10. Refer to FIGS. 1 and 2. The center C1 of the projection screen 10 is located on the vertical center line VL, which is at a half width of the projection screen 10. During the installation of the projector 100, after the at least one positioning mark 131 and/or 132 is aligned with the vertical center line VL and the pitch angle of the projector 100 is adjusted, the imaging center A1 of the optical image MG will be aligned with the center C1 of the projection screen 10.

According to another embodiment of the present invention, the projectors 100 and 101 having a laser emitter 135 are provided. The laser emitter 135 is configured to align the imaging center A1 of the optical image MG with the center C1 of the projection screen 10.

Figure 5:
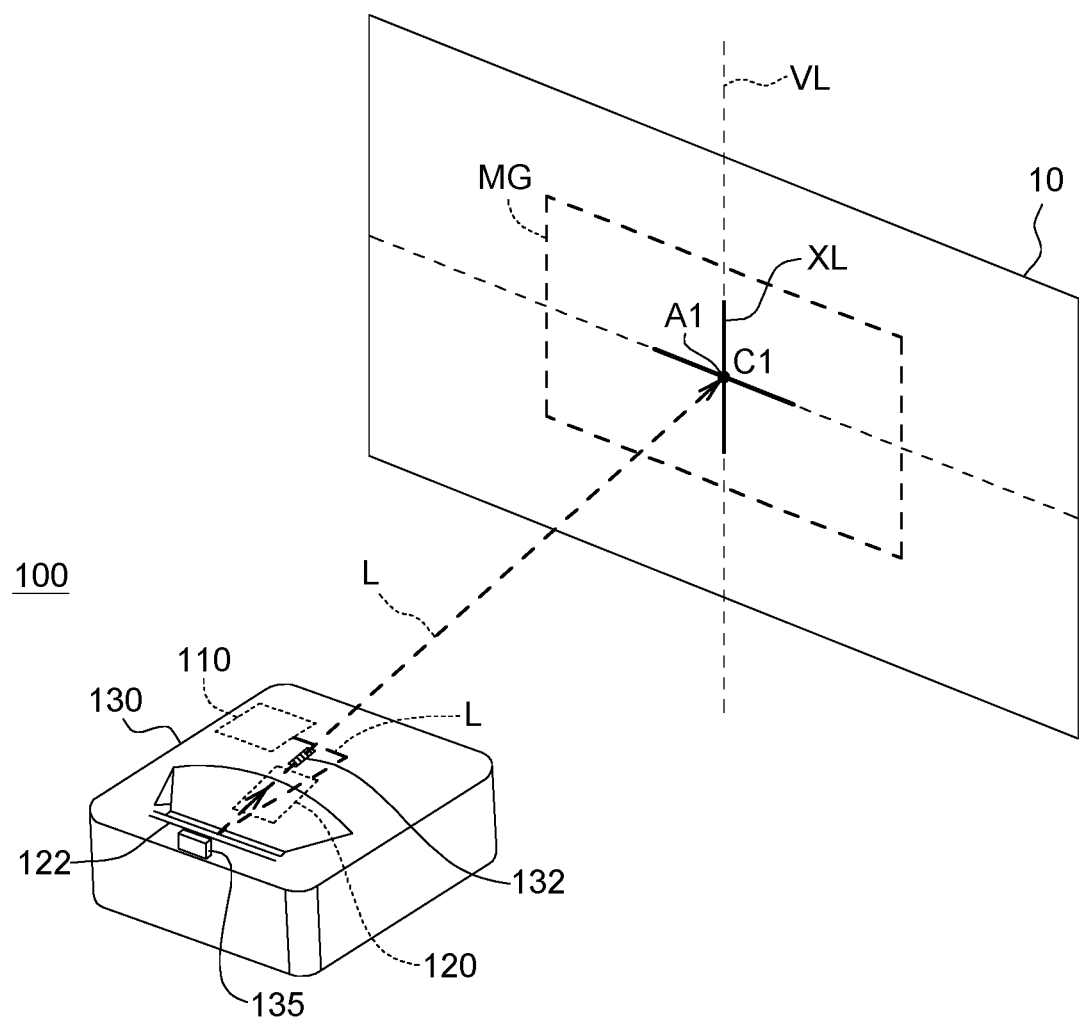
FIG. 5 is a schematic diagram of a projector according to an embodiment of the present invention.
Figure 6:
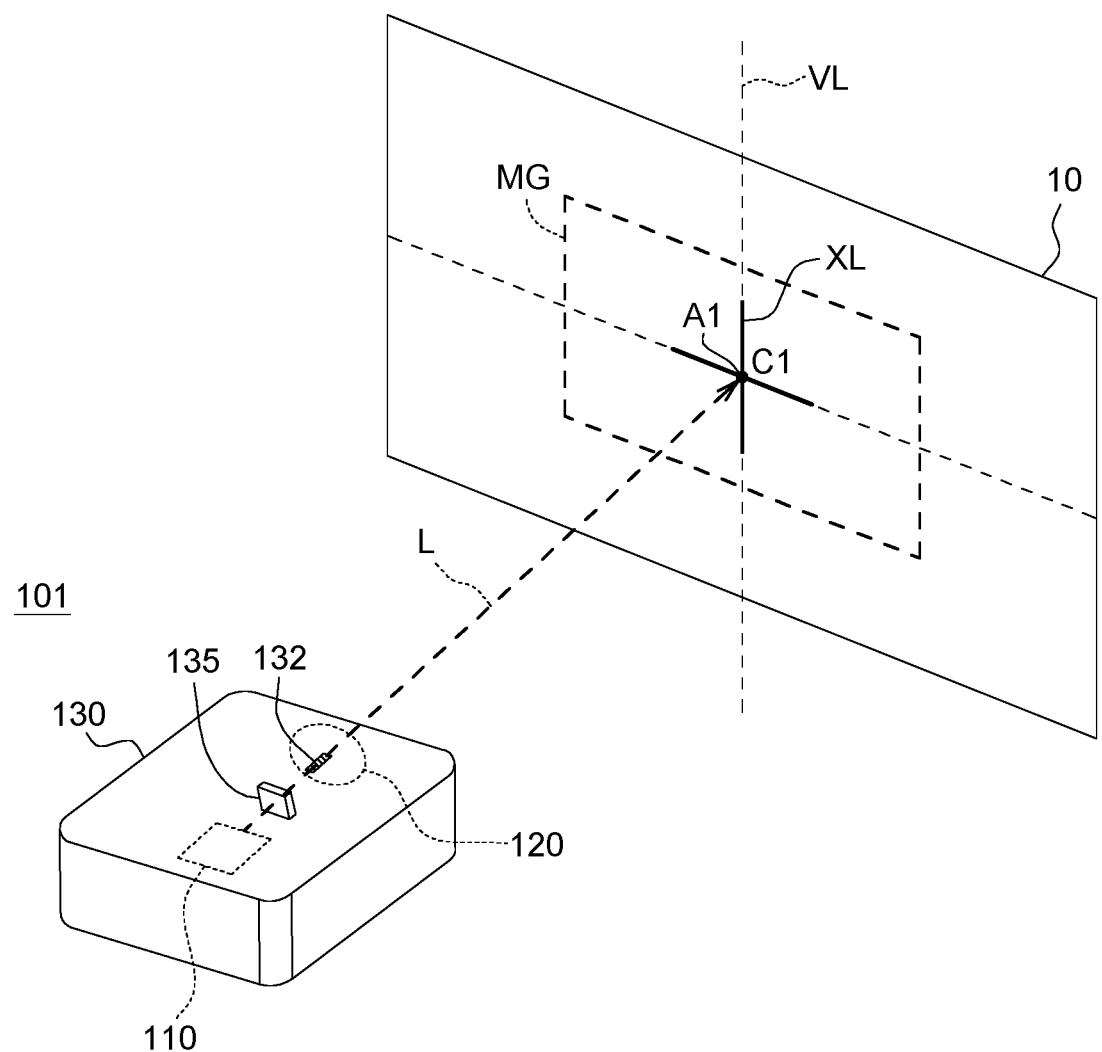
FIG. 6 is a schematic diagram of a projector according to another embodiment of the present invention.

Referring to FIG. 5 and FIG. 6, schematic diagrams of projectors 100 and 101 according to two embodiments of the present invention are respectively shown. The projectors 100 and 101 of the present embodiment are similar to the projectors 100 and 101 of the above embodiments, and identical designations are used to denote identical elements. The projectors 100 and 101 of the present embodiment are different from the projectors 100 and 101 of the above embodiments in that the projectors 100 and 101 of the present embodiment further include a laser emitter 135 configured to form a laser mark XL on a projection screen 10.

In an embodiment, the vertical center line VL is aligned with a laser mark XL formed by the laser emitter 135. Since the imaging center A1 of the optical image MG is unknown when the projector leaves the factory, the user can align the center C1 or the vertical center line VL of a projection screen 10 through the assistance of the laser mark XL. During the installation of the projector 100, the laser emitter 135 projects the laser mark XL on the projection screen 10 to align the laser mark XL with the vertical center line VL of the projection screen 10. After the positioning mark 132 is aligned with the laser mark XL and the pitch angle of the projector 100 is adjusted, the imaging center A1 of the optical image MG will be aligned with the center C1 of the projection screen 10.

In an embodiment, the laser mark XL can be realized by a one-dimensional I-shaped mark line, a two-dimensional cross-shaped mark line or a window-shaped mark line in a three-dimensional space as long as the mark line can clearly mark the vertical center line VL or the center C1 of the projection screen 10.

In an embodiment, the laser emitter 135, for example, can be in-built on the casing 130 or additionally assembled to the casing 130. During the installation of the projector 100, the laser emitter 135 is activated to position the projector 100 and the projection screen 10. Before the projector leaves the factory, the laser emitter 135 is already set to be aligned with the center A1 of the optical image MG and therefore does not require the positioning mark 132. As disclosed above, before obtaining the imaging center A1 of the optical image MG which is set before the projector leaves the factory, the user can align the center A1 of the optical image MG with the center C1 of the projection screen 10 through the assistance of the laser mark XL and/or the at least one positioning mark 131 and/or 132.

Under the circumstance that power supply is not available at the installation site of the projector, the installation personnel cannot turn on the projector to check whether the center A1 of the optical image MG is already aligned with the center C1 of the projection screen 10, and cannot determine whether the installation position of the projector is correct or not until power supply is provided to the projector at the last stage. If the installation position of the projector is found to be incorrect, the installation personnel need to change the installation position of the projector, which is very inconvenient. In the present embodiment, since the center A1 of the optical image MG is already aligned with at least one positioning mark 131 and/or 132 in the design stage of the projectors 100 and 101, the installation personnel only need to check whether the at least one positioning mark 131 and/or 132 are aligned with the center C1 or the vertical center line VL of the projection screen 10. Therefore, the above problem of incorrect installation can be avoided.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
    an optical machine configured to form an optical image;
    a lens located on a projection path of the optical machine so that the optical image is projected on the lens; and
    a casing configured to receive the optical machine and the lens and provided with a positioning mark, which is aligned with an imaging center of the optical image in a vertical direction and configured to align the imaging center of the optical image with a center of a projection screen.

2. The projector according to claim 1, wherein the lens has an optical axis, and the optical image is projected on the lens along the optical axis.

3. The projector according to claim 1, wherein the lens has an optical axis, and the optical image is projected on the lens off an axial direction of the optical axis.

4. The projector according to claim 1, wherein the positioning mark comprises at least one alignment line, at least one alignment point or a combination of the at least one alignment line and the at least one alignment point.

5. The projector according to claim 4, wherein the positioning mark comprises two alignment lines, two alignment points or a combination thereof.

6. The projector according to claim 1, further comprising a laser emitter configured to form a laser mark on the projection screen, wherein the positioning mark is aligned with the center of the projection screen through the laser mark.

7. The projector according to claim 6, wherein the laser mark is an I-shaped mark line, a cross-shaped mark line or a window-shaped mark line.

8. The projector according to claim 1, wherein the imaging center of the optical image is deviated from a center of the lens.

9. The projector according to claim 1, wherein the imaging center of the optical image is aligned with a center of the lens.

10. The projector according to claim 1, further comprising a lens adjusting mechanism configured to adjust or shift a center position of the lens.

11. A projector, comprising:
    an optical machine configured to form an optical image;
    a lens located on a projection path of the optical machine so that the optical image is projected on the lens;
    a laser emitter configured to form a laser mark on a projection screen; and
    a casing configured to receive the optical machine and the lens, wherein the laser mark is aligned with an imaging center of the optical image in a vertical direction.

12. The projector according to claim 11, wherein the lens has an optical axis, and the optical image is projected on the lens along the optical axis.

13. The projector according to claim 11, wherein the lens has an optical axis, and the optical image is projected on the lens off an axial direction of the optical axis.

14. The projector according to claim 11, wherein the laser mark is an I-shaped mark line, a cross-shaped mark line or a window-shaped mark line.

15. The projector according to claim 11, wherein the laser mark is configured to align the imaging center of the optical image with a center of a projection screen.

16. The projector according to claim 11, wherein the imaging center of the optical image is deviated from or aligned with a center of the lens.

17. The projector according to claim 11, further comprising a lens adjusting mechanism configured to adjust or shift a center position of the lens.

18. The projector according to claim 11, further comprising a positioning mark provided on the casing, wherein the positioning mark is aligned with a center of a projection screen through the laser mark and configured to align the imaging center of the optical image with the center of the projection screen.

19. The projector according to claim 11, wherein the positioning mark comprises at least one alignment line, at least one alignment point or a combination thereof.

20. The projector according to claim 19, wherein the positioning mark comprises two alignment lines, two alignment points or a combination thereof.

* * * * *